(12) United States Patent
Chung

(10) Patent No.: US 10,986,636 B2
(45) Date of Patent: *Apr. 20, 2021

(54) SATELLITE DIVERSITY

(71) Applicant: Maxar Space LLC, Palo Alto, CA (US)

(72) Inventor: Kirby Chung, Palo Alto, CA (US)

(73) Assignee: Maxar Space LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,937

(22) Filed: Jul. 9, 2019

(65) Prior Publication Data
US 2019/0335464 A1 Oct. 31, 2019

Related U.S. Application Data

(62) Division of application No. 15/221,273, filed on Jul. 27, 2016, now Pat. No. 10,397,920.
(Continued)

(51) Int. Cl.
*H04W 72/04* (2009.01)
*H04B 7/185* (2006.01)
(Continued)

(52) U.S. Cl.
CPC .... *H04W 72/0453* (2013.01); *H04B 7/18504* (2013.01); *H04B 7/18508* (2013.01);
(Continued)

(58) Field of Classification Search
CPC ............ H04B 7/15507; H04B 7/185; H04B 7/18504; H04B 7/18508; H04B 7/1851;
(Continued)

(56) References Cited

U.S. PATENT DOCUMENTS 5,722,042 A * 2/1998 Kimura ................. H04B 7/195
342/352
5,926,758 A 7/1999 Grybos
(Continued)

OTHER PUBLICATIONS

Wikipedia, "Iridium satellite constellation," [http://en.wikipedia.org/wiki/Indium_satellite_constellation], downloaded on Jul. 14, 2016, 6 pages.
(Continued)

*Primary Examiner* — Robert J Lopata
(74) *Attorney, Agent, or Firm* — Vierra Magen Marcus LLP

(57) ABSTRACT

A wireless communication system includes frequency reuse between terminals in common coverage regions using a multiple satellite architecture with spatial diversity. Different terminals may be associated with different ones of the satellites such that a common frequency can be reused by the different terminals. A gateway may communicate with a first satellite using a feeder beam having an overlapping geographic coverage region with a user beam used for communication between a set of user terminals and a second satellite. Spatial diversity is provided between the satellites, and the feeder beam and the user beam operate at common frequencies within the overlapping coverage region. In this manner, the bandwidth of both satellites at the common coverage region is used to increase the available capacity.

19 Claims, 12 Drawing Sheets

Related U.S. Application Data

(60) Provisional application No. 62/286,144, filed on Jan. 22, 2016.

(51) Int. Cl.
*H04W 4/021* (2018.01)
*H04B 7/204* (2006.01)

(52) U.S. Cl.
CPC ..... *H04B 7/18513* (2013.01); *H04B 7/18521* (2013.01); *H04B 7/2041* (2013.01); *H04W 4/021* (2013.01); *H04W 72/042* (2013.01); *H04W 72/0413* (2013.01)

(58) Field of Classification Search
CPC ............ H04B 7/18513; H04B 7/18515; H04B 7/18521; H04B 7/18523; H04B 7/18528; H04B 7/1853; H04B 7/18552; H04B 7/18567; H04W 84/06
USPC ........................................................ 370/316
See application file for complete search history.

(56) References Cited

U.S. PATENT DOCUMENTS

| | | | |
|---|---|---|---|
| 6,011,951 A | 1/2000 | King et al. | |
| 6,091,933 A | 7/2000 | Sherman et al. | |
| 6,253,080 B1* | 6/2001 | Wiedeman | H04B 7/18558 370/316 |
| 6,463,279 B1 | 10/2002 | Sherman et al. | |
| 7,180,873 B1* | 2/2007 | Monte | H04B 7/204 370/325 |
| 7,738,837 B2 | 6/2010 | Karabinis | |
| 8,712,321 B1 | 4/2014 | Dankberg | |
| 2002/0041575 A1 | 4/2002 | Karabinis et al. | |
| 2004/0072561 A1 | 4/2004 | LaPrade | |
| 2005/0118947 A1 | 6/2005 | Ames et al. | |
| 2006/0189275 A1 | 8/2006 | Karabinis | |
| 2006/0189309 A1 | 8/2006 | Good et al. | |
| 2006/0246838 A1 | 11/2006 | Karabinis | |
| 2007/0037514 A1* | 2/2007 | Karabinis | H04B 7/18521 455/13.3 |
| 2008/0146145 A1 | 6/2008 | Pateros et al. | |
| 2009/0285151 A1* | 11/2009 | Eidenschink | H04B 7/18582 370/316 |
| 2009/0286467 A1* | 11/2009 | Miller | H04B 7/2041 455/3.02 |
| 2009/0291633 A1* | 11/2009 | Dankberg | H04B 7/18543 455/12.1 |
| 2009/0298423 A1 | 12/2009 | Dankberg et al. | |
| 2012/0009920 A1 | 1/2012 | Karabinis | |
| 2012/0244798 A1* | 9/2012 | Dankberg | H04B 7/18513 455/12.1 |
| 2013/0329630 A1 | 12/2013 | Becker | |
| 2013/0331026 A1 | 12/2013 | O'Neill et al. | |
| 2014/0065950 A1 | 3/2014 | Mendelsohn et al. | |
| 2014/0295752 A1 | 10/2014 | Dankberg | |
| 2015/0263802 A1* | 9/2015 | Dankberg | H04B 7/18543 455/427 |
| 2016/0037434 A1* | 2/2016 | Gopal | H04L 45/02 370/316 |
| 2016/0352413 A1 | 12/2016 | Tani et al. | |
| 2017/0041066 A1 | 2/2017 | Chu | |
| 2017/0099095 A1 | 4/2017 | Wang | |
| 2017/0237182 A1 | 8/2017 | Tran | |
| 2017/0339710 A1 | 11/2017 | Johnson et al. | |
| 2018/0041269 A1 | 2/2018 | Buer et al. | |
| 2018/0175932 A1 | 6/2018 | Lucky et al. | |
| 2018/0191380 A1* | 7/2018 | Subramaniam | H03M 13/6522 |

OTHER PUBLICATIONS

Restriction Requirement dated Mar. 5, 2018, U.S. Appl. No. 15/221,273, filed Jul. 27, 2016.
Response to Restriction Requirement dated May 4, 2018, U.S. Appl. No. 15/221,273, filed Jul. 27, 2016.
Non-final Office Action dated Aug. 2, 2018, U.S. Appl. No. 15/221,273, filed Jul. 27, 2016..
Response to Office Action dated Nov. 1, 2018, U.S. Appl. No. 15/221,273, filed Jul. 27, 2016.
Non-final Office Action dated Feb. 8, 2019, U.S. Appl. No. 15/221,273, filed Jul. 27, 2016.
Response to Office Action dated May 1, 2019, U.S. Appl. No. 15/221,273, filed Jul. 27, 2016.
Notice of Allowance dated May 30, 2019, U.S. Appl. No. 15/221,273, filed Jul. 27, 2016.

* cited by examiner

| | 19.7-19.95 | 19.95-20.2 | 29.5-29.75 | 29.75-30.00 |
|---|---|---|---|---|
| Forward Uplink | | | a,c | b,d |
| Return Downlink | A,C | B,D | | |
| Return Uplink | | | a,c | b,d |
| Forward Downlink | A,C | B,D | | |

FIG. 6

| | | 19.7-19.95 | 19.95-20.2 | 29.5-29.75 | 29.75-30.00 |
|---|---|---|---|---|---|
| SATX | Forward Uplink Beam 123-2 | | | a,c | b,d |
| SATX | Return Downlink Beam 123-2 | A,C | B,D | | |
| SATY | Return Uplink Beam 142-1 | | | a | |
| SATY | Forward Downlink Beam 142-1 | A | | | |
| SATY | Return Uplink Beam 142-2 | | | | b |
| SATY | Forward Downlink Beam 142-2 | | B | | |
| SATY | Return Uplink Beam 142-5 | | | c | |
| SATY | Forward Downlink Beam 142-5 | C | | | |

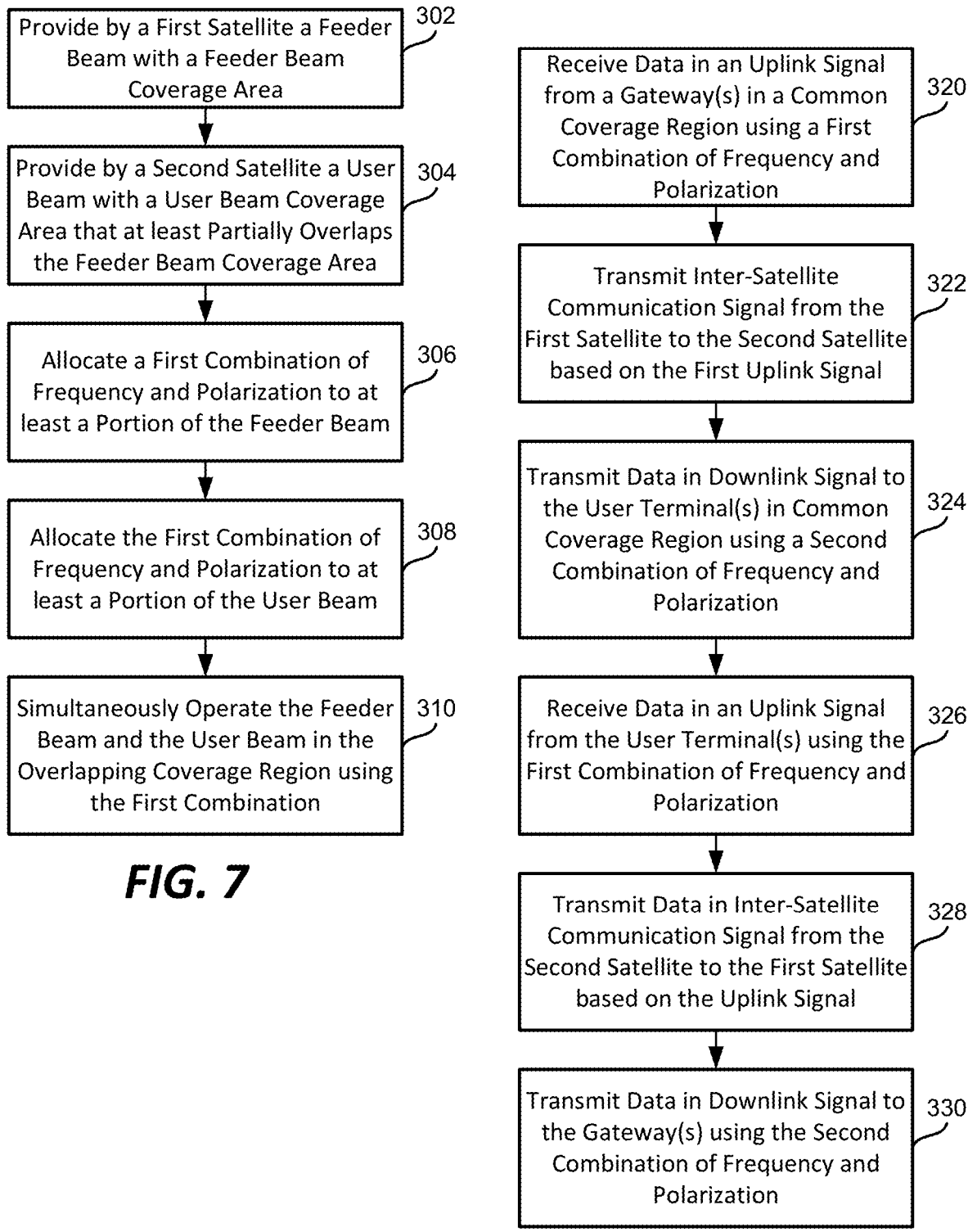

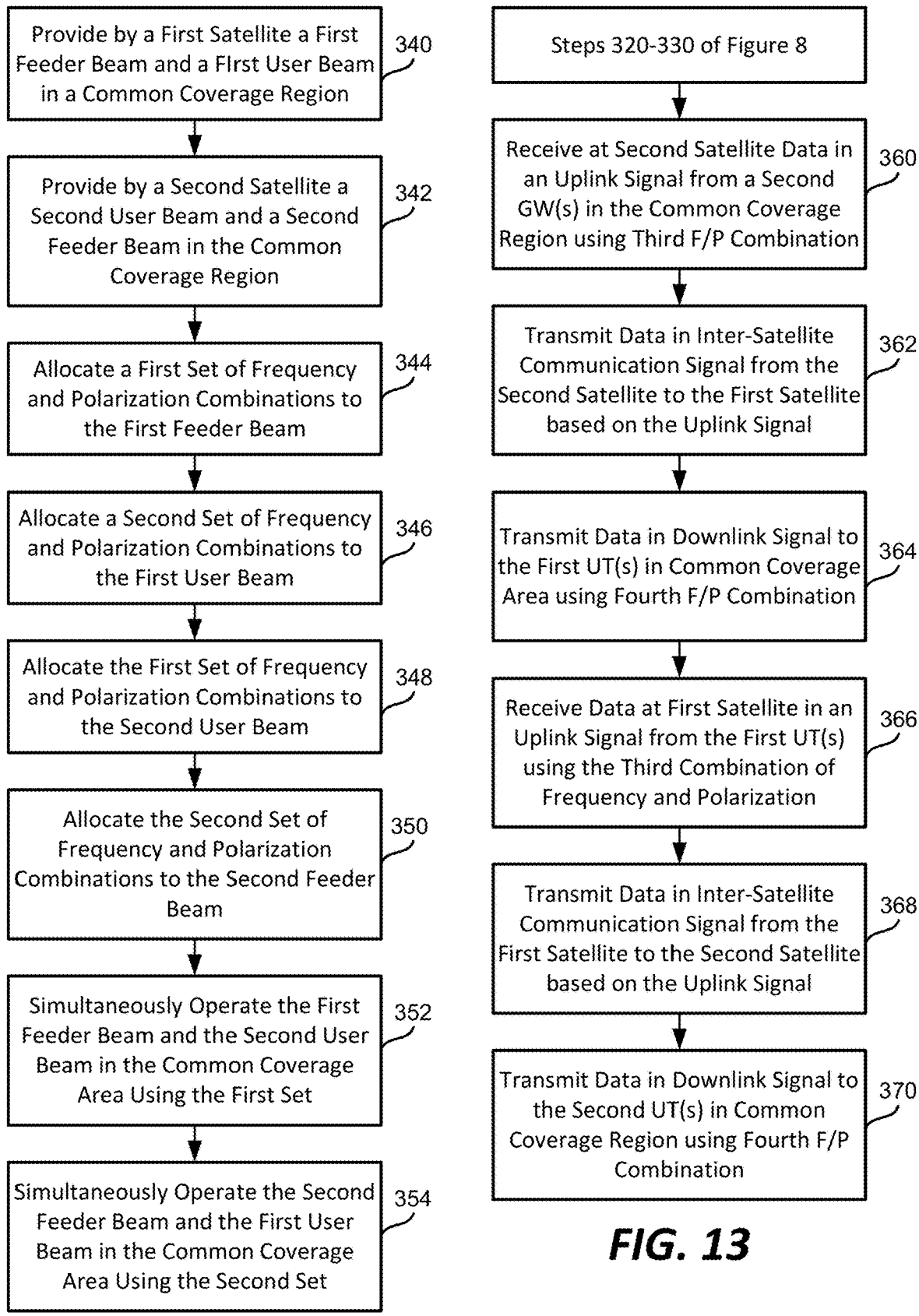

SATELLITE DIVERSITY

CLAIM OF PRIORITY

The present application is a divisional application of U.S. patent application Ser. No. 15/221,273, entitled "Satellite Diversity," by Kirby Chung, filed Jul. 27, 2016, published as US 2017/0215190 on Jul. 27, 2017 and issued as U.S. Pat. No. 10,397,920 on Aug. 27, 2019, which claims priority from U.S. Provisional Patent Application No. 62/286,144, entitled "Satellite Diversity," by Kirby Chung, filed Jan. 22, 2016, incorporated by reference herein in its entirety.

BACKGROUND OF THE INVENTION

The present disclosure relates to technology for wireless communication systems.

Wireless communication systems typically include a communication platform such as a dedicated terrestrial antenna, airborne platform, or communications spacecraft such as a satellite. Such platforms typically operate within regulations that allocate at least one operating frequency bandwidth for a particular communications service and specify, among other things, a maximum signal power spectral density (PSD) of communications signals radiated to the ground, etc. A growing market exists for provision of high data rate communication services to individual consumers and small businesses which may be underserved by or unable to afford conventional terrestrial services. To advantageously provide high data rate communication services to such users, a communications platform must (1) provide a high PSD so as to enable the use of low cost user terminals, and (2) efficiently use the licensed bandwidth so as to maximize the communications throughput for a particular licensed bandwidth.

Typically, frequency reuse plans are developed prior to design and deployment of a communications system in order to service the projected needs of the system. Frequencies are often reused between geographically separated terminals. For example, highly directional antennas may be used to create multiple gateway and user beams. Frequencies may be re-used between the gateway beams and user beams where the beams and terminals within the beams are geographically separated with adequate spatial isolation. Additionally, frequencies may be reused between user beams where the user beams are geographically separated and may be reused between gateway beams where the gateway beams are geographically isolated. Because of the requirements of spatial isolation between the terminals, capacity may be limited.

BRIEF DESCRIPTION OF THE DRAWINGS

FIG. 6 is a table describing an example of frequency reuse within a common coverage region in accordance with one embodiment.

FIG. 7 is a flowchart describing a process of reusing frequencies within a common coverage region by a multi-satellite system in accordance with one embodiment.

FIG. 8 is a flowchart describing a process of communication with a gateway and one or more user terminals using a multi-satellite system in accordance with one embodiment.

FIG. 12 is a flowchart describing a process of reusing frequencies within a common coverage region by satellites that service both gateways and user terminals in a common coverage region in accordance with one embodiment.

FIG. 13 is a flowchart describing a process of communication between gateways and user terminals by satellites that service both gateways and user terminals in a common coverage region in accordance with one embodiment.

DETAILED DESCRIPTION

Figure 1:
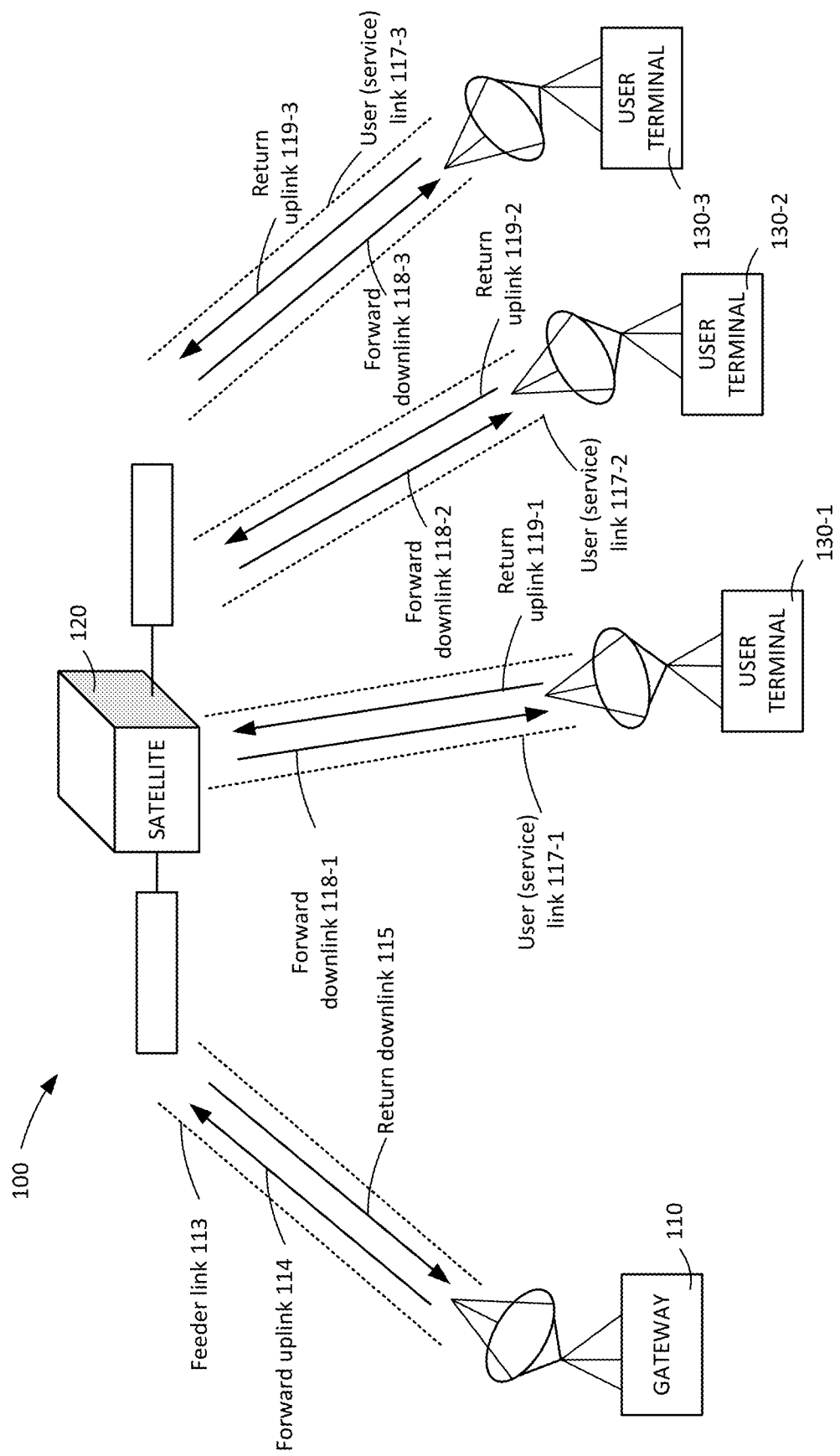
FIG. 1 is a simplified block diagram describing an example of a wireless communications system.

The disclosed technology is directed to bandwidth allocations in wireless communication systems that provide frequency re-use. Wireless communication systems are disclosed including multiple satellites that provide spot beams to cover a geographic service region. The spot beams are associated with coverage regions within the overall geographic service region. The spot beams may be associated with one or more gateway terminals and/or one or more user terminals.

Frequency re-use is employed such that unique combinations of frequency and polarization are associated with beams provided by two or more satellites to an overlapping coverage region. In one example, a first satellite provides a feeder beam having a feeder beam coverage area that at least partially overlaps with a user beam coverage area associated with a user beam provided by a second satellite. Spatial diversity is provided between the two satellites to permit frequency re-use for the overlapping feeder and user beams. Inter-satellite communication links are provided to transmit data between the two satellites. In this manner, a gateway can communicate with the first satellite using the same frequencies with which a user terminal communicates with the second satellite. Communication between the gateway and user terminals is facilitated by the inter-satellite communication links. With such an approach, two or more satellites provide coverage to a common service region using the same frequencies such that system capacity can be increased in the common coverage region by the sum of the capabilities of each satellite in that region. Additional satellites in addition to the first and second satellite can be employed to provide additional user beams to the common coverage area to thereby further increase the available capacity in the area.

In one example, the first satellite receives uplink signals in the feeder beam from a gateway in the common coverage area using a first combination of frequency band and antenna polarization ("F/P combination") and provides downlink signals to the gateway using a second F/P combination. The second satellite receives uplink signals in a user beam from a user terminal in the common coverage area using the first F/P combination and provides downlink signals to the user terminal using the second F/P combination. Alternately, the second satellite may receive the uplink signals using the second F/P combination and provide the downlink signals using the first F/P combination.

Data is received at the first satellite from an uplink signal of the feeder beam using the first F/P combination. The first satellite transmits the data using an inter-satellite communication link to the second satellite. The inter-satellite communication link may use the same or different frequencies than the uplinks and downlinks. The second satellite transmits the data in a downlink signal of the user beam to the common coverage area.

In a similar manner, the multiple satellites may provide bi-directional communication between two user terminals using the same frequencies. For example, data can be received at the first satellite in an uplink signal of first user beam from a first user terminal using a first F/P combination. The first satellite transmits the data to the second satellite using an inter-satellite communication link. Similarly, data can be received at the second satellite in an uplink signal of a second user beam from a second user terminal using the first F/P combination. The second satellite transmits the data from the second user terminal to the first satellite. The first satellite transmits the data from the second user terminal in a downlink signal to the first user terminal using a second F/P combination and the second satellite transmits the data from the first user terminal in a downlink signal to the second user terminal using the first F/P combination. Alternately, the downlink from the second satellite may use the first F/P combination and the uplink use the second F/P combination.

In one embodiment, each satellite is a dedicated gateway satellite that provides feeder beams for one or more gateways or a dedicated user terminal satellite that provides user beams for sets of user terminals. Access functions can be separated between the satellites to allow system optimizations for capacity or reach-back to distances between user terminals and gateways that are larger than one satellite may perform to avoid so-called double-hop.

In another embodiment, the individual satellites may be associated with both gateways and user terminals. For example, the first satellite can receive uplink signals from a gateway in the common coverage area using a first F/P combination and provide downlink signals to the gateway using a second F/P combination. The first satellite can receive uplink signals from a first set of user terminals in the common coverage area using a third F/P combination and provide downlink signals to the first set using a fourth F/P combination. The second satellite can receive uplink signals from a second set of user terminals in the common coverage area using the first F/P combination and provide downlink signals to the second set of user terminals using the second F/P combination. The second satellite can receive uplink signals from a second gateway in the common coverage area using the third F/P combination and provide downlink signals to the second gateway using the fourth F/P combination. Variations of the described re-frequency re-uses may be employed whereby two terminals in a common coverage area may use the same frequencies without interference by communicating with different satellites having spatial separation.

FIG. 1 depicts a simplified diagram of a portion of a typical wireless communications environment. In the example of FIG. 1, a communications platform includes a satellite 120 forming part of a wireless communications network 100. Satellite 120 may be located, for example, at a geostationary or non-geostationary orbital location. Satellite 120 may be communicatively coupled, via at least one feeder link antenna, to at least one gateway 110 and, via at least one user link antenna to a plurality of user terminals 130. The term user terminals 130 may be used to refer to a single user terminal or user terminals such as user terminals 130-1, 130-2, 130-3 collectively. A user terminal is adapted for communication with a wireless communication platform such as satellite 120. User terminals may include fixed and mobile user terminals including, but not limited to, a cellular telephone, wireless handset, a wireless modem, a data transceiver, a paging or position determination receive, or mobile radio-telephone. A user terminal may be hand-held, portable (including vehicle-mounted installations for cars, trucks, boats, trains, planes, etc.) or fixed as desired. A user terminal may be referred to as a wireless communication device, a mobile station, a mobile wireless unit, a user, a subscriber, or a mobile device.

The at least one gateway 110 may be coupled to a network such as, for example, the Internet, terrestrial public switched telephone network, mobile telephone network, etc. A gateway 110 and the satellite 120 communicate over a feeder link 113, which has both a forward uplink 114 and a return downlink 115. Feeder link 113 may operate for example, in an assigned or allocated frequency band (e.g, between 17 and 80 GHz). Although a single gateway is shown, typical implementations will include many gateways, such as five, ten, or more. Each gateway may utilize its own gateway beam, although more than one gateway can be positioned within a beam.

User terminals 130 and the satellite 120 communicate over user links 117 that have both a forward downlink 118 and a return uplink 119. Three user terminals with three user links 117-1-117-3 are shown by way of example. Typical implementations will include many user terminals. Moreover, many user terminals may be located within the geographic coverage area of a single user beam. Many user beams may be included in various implementations. For example, fifty, sixty or more (or less) user beams may be used to generate a service region. User link 117 may operate in an assigned frequency band that is different than or the same as the frequency assigned to feeder link 113. For example, the user links may operate in the same assigned frequency band as the gateway, such as where the gateway is located in a coverage area spatially separated from the coverage areas of the user beam or user beams for which the frequency is re-used. In other examples, one or more gateways may be located in the same coverage area as a user beam coverage area. The gateway may share the available frequency spectrum.

A spacecraft antenna subsystem may provide an antenna beam pattern wherein an entire service region is covered using the available bandwidth at a single time using a single beam. In another example, however, multiple satellite antenna beams (or cells) are provided, each of which can serve a substantially distinct cell within an overall service region. In one embodiment, satellite 120 is a multi-beam spacecraft having an antenna subsystem for providing a grid of antenna spot beams. The shape of the grid in turn defines a service region. The grid of individual spot beams (user beams) divides an overall service region into a number of smaller cells. For example, U.S. patent application Ser. No. 11/467,490 describes a pattern of 135 spot beams covering the continental United States (CONUS), Hawaii, Alaska, and Puerto Rico. It is noted that a service region may be defined in any manner to cover any desired geographic location. In one embodiment, the antenna subsystem includes a phased array antenna, a direct radiating antenna, or a multi-feed fed reflector.

Dividing the overall service region into a plurality of smaller cells permits frequency reuse, thereby substantially increasing the bandwidth utilization efficiency. In some examples of frequency reuse, a total bandwidth allocated to the downlink is divided into separate non-overlapping blocks for the forward downlink 118 and the return downlink 115. Similarly, the total bandwidth allocated to the uplink is divided into separate non-overlapping blocks for the forward uplink 114 and the return uplink 119.

In other examples, some or all of the allocated bandwidth is reused by the gateway(s) 110, thereby providing for simultaneous operation of at least a portion of the feeder link 113 and a portion of the user link 117 at common frequencies. More specifically, forward uplink 114 and return uplink 119 may reuse the same frequency and forward downlink 118 and return downlink 115 may reuse the same frequency. Simultaneous operation of the feeder link 113 and the user link 117 at common frequencies means that the gateway(s) 110 may reuse any part of the total bandwidth allocated to the user antenna beams. This may be accomplished in various ways.

The architecture of FIG. 1 is provided by way of example and not limitation. Embodiments of the disclosed technology may be practiced using numerous types of implementations. For example, some communications systems may only include a single terminal type, such as user terminals that communicate with one another. In such systems, gateways may not be used.

Figure 2:
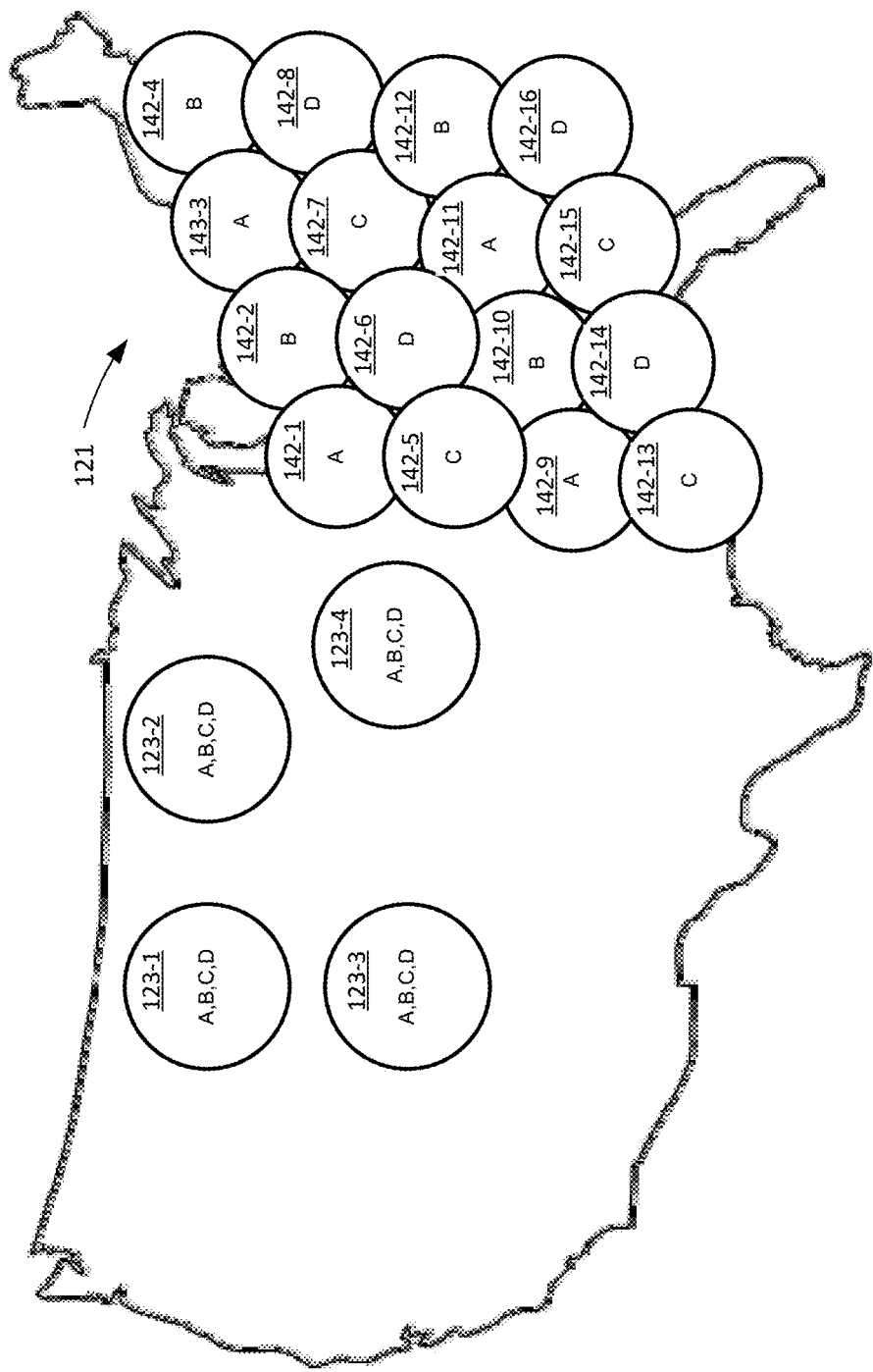
FIG. 2 is a map describing the placement of gateways and user beams and an example of a frequency reuse plan.

FIG. 2 depicts a specific example of an antenna coverage pattern that provides for spatial separation between the gateway(s) 110 in gateway beams 123 and a service region 121 of user beams 142 to enable non-interfering use of the same frequency by the gateway(s) 110 and user terminals 130. FIG. 2 is provided by way of example only, as it will be apparent that any number and type of coverage patterns may be used in accordance with embodiments of the disclosed technology. As shown in FIG. 2, the service region 121 is defined as the footprint made by a plurality of user beams 142. The term user beam 142 may be used to refer to a single user beam or multiple user beams such as 142-1 to 142-16 collectively. These user beams correspond to the geographic coverage area serviced by a particular user link 117. A user terminal 130 located within the footprint of any of the user beams 142 may be communicatively coupled over a user link 117 to spacecraft 120. Each gateway 110 is located in a gateway beam 123. Spacecraft 120 may be communicatively coupled over feeder link 113 to any one of the gateways 110. Each gateway 110 may also be proximate to, and communicatively coupled with, a high speed Internet backbone access point. Each of the gateway beams is substantially spatially isolated from the service region 121. Because of this spatial isolation, the user link 117 is operable at the same frequency(ies) as the feeder link 113. Moreover, the frequency band common to both the feeder link 113 and the user link 117 may encompass substantially all of the allocated bandwidth.

Typically, frequency reuse by two or more user beams 142 may be used but the beams require spatial isolation or different polarizations. For example, any two user beams may employ the same frequency without regard to antenna polarization where the two user beams are spatially isolated (i.e., not adjacent or overlapping). Adjacent user beams may use a common frequency where each adjacent user beam operates at a different antenna polarization. Frequency re-use within a plurality of user beams 142 may also use, for example, what is referred to as a "color" re-use plan.

Figures 3A, 3B:
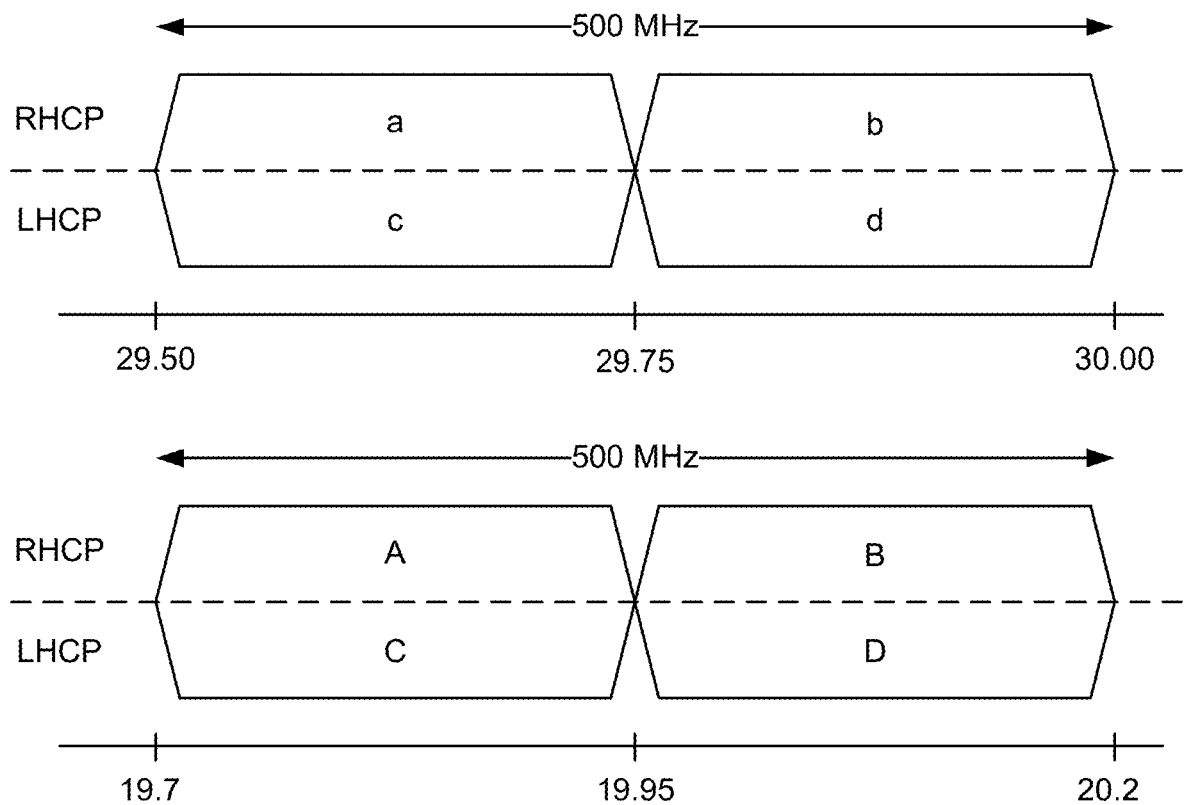
FIG. 3A is a diagram describing an example of unique combinations of frequency and polarization that may be used in a frequency reuse plan.
FIG. 3B is a diagram describing the frequency assignments for uplinks and downlinks using the frequency/polarization combinations in FIG. 3A.

FIG. 3A is a diagram showing a frequency band allocation in a communications system for a set of uplink signals and downlink signals. A specific example is described of a color re-use plan. Each color represents a unique combination of frequency band and antenna polarization. In this example, color 'a' represents a first sub-band (29.50 GHz-29.75 GHz) of an allocated uplink frequency band (29.50 GHz-30.00 GHz) with a right-hand circular polarization (RHCP). Color 'b' represents a second sub-band (29.75 GHz-30.00 GHz) of the allocated uplink frequency band with RHCP. Color 'c' represents the first sub-band of the allocated uplink frequency band with a left-hand circular polarization (LHCP). Color 'd' represents the second sub-band of the allocated uplink frequency band with LHCP.

Similarly for the downlink, color 'A' represents a first sub-band (19.70 GHz-19.95 GHz) of the allocated downlink frequency band (19.70 GHz-20.20 GHz) with RHCP. Color 'B' represents a second sub-band (19.95 GHz-20.20 GHz) of the allocated downlink frequency band with RHCP. Color 'C' represents the first sub-band of the allocated downlink frequency band with LHCP. Color 'D' represents the second sub-band of the allocated downlink frequency band with LHCP. The colors may include other allocations of the frequency band and polarization.

FIG. 3B is a table showing an example of an allocation of the unique frequency/polarization combinations to the uplink and downlink signals for feeder and user beams. The forward uplinks and return uplinks share the 29.50 GHz-30.00 GHz spectrum such that colors a-d can be re-used. Colors 'a' and 'c' in the 29.50 GHz to 29.75 GHz band are colors assigned to spot beams for both forward uplinks and return uplinks. Colors 'b' and 'd' in the 29.75 GHz to 30.00 GHz band are colors assigned to spot beams for both forward uplinks and return uplinks. The forward uplinks are used for gateway to satellite communication in one example. If the gateways are geographically isolated all of the colors 'a'-'d' may be re-used by all of the gateways. If a gateway beam is adjacent to another gateway beam or is adjacent to a user beam, the assignments may be made in such a way that the gateway beam does not use the same color for any beam to which it is adjacent. The return uplinks are used for user terminal to satellite communication in one example. Each user spot beam may be assigned one dedicated color 'a'-'d', for example, as shown in FIG. 2. The assignments may be made such that adjacent user beams do not share the same color.

Similarly, the forward downlinks and return downlinks share the 19.70 GHz-20.20 GHz spectrum such that colors A-D can be re-used between the forward and return downlinks. Colors 'A' and 'C' in the 19.70 GHz to 19.95 GHz band are colors assigned to spot beams for both forward downlinks (e.g., user terminals) and return downlinks (e.g., gateways) as well as colors 'B' and 'C' in the 19.975 GHz to 20.20 GHz band. The return downlinks are used for satellite to gateway communication in one example. If the gateways are geographically isolated all of the colors 'A'-'D' may be re-used by all of the gateways. If a gateway beam is adjacent to another gateway beam or is adjacent to a user beam, the assignments may be made in such a way that the gateway beam does not use the same color for any beam to which it is adjacent. The forward downlinks are used for satellite to user terminal communication in one example. Each user spot beam may be assigned one dedicated color 'A'-'D', for example, as shown in FIG. 2. The assignments may be made such that adjacent user beams do not share the same color.

Typically, an assignment of colors to user beams 142 provides that two adjacent user beams do not share both a common frequency and a common polarization for use at a given time. In the disclosed example, adjacent beams do not share the same color such that the unique combinations of frequency and polarization are not shared between beams. In FIG. 2, an example is shown where each gateway beam is spatially separated from each of the user beams as well as the other gateway beams. Accordingly, each gateway may operate in its feeder beam at every color without interfering with communication in the other user beams and gateway beam. The individual user beams operate at one of the four available colors such that no two adjacent user beams share the same color. In this manner, frequency reuse between user beams does not lead to interference where the coverage areas at least partially overlap.

It is noted that in FIG. 2 only the uppercase lettering designating the downlink signals in the feeder and user beams is shown for simplicity. Similarly, each beam operates at the frequency/polarization combination for uplink signals at the corresponding lowercase color. Moreover, a four color re-use plan is provided as an example only as any number of colors may be used in a given frequency re-use plan. For example, three color re-use plans are common whereby a first color represents a first frequency band and first polarization, a second color represents a second frequency band and the first polarization, and a third color represents the entire frequency band at the second polarization. For a further discussion of frequency re-use, refer to U.S. Pat. No. 7,793,070, entitled "Multi-Beam Satellite Network to Maximize Bandwidth Utilization." It is noted that the service region and antenna pattern of FIG. 2 is a simplified example. The disclosed concepts may be practiced in any geographic service region. Numerous examples and implementations may be practiced within the scope of the disclosure.

Figure 4:
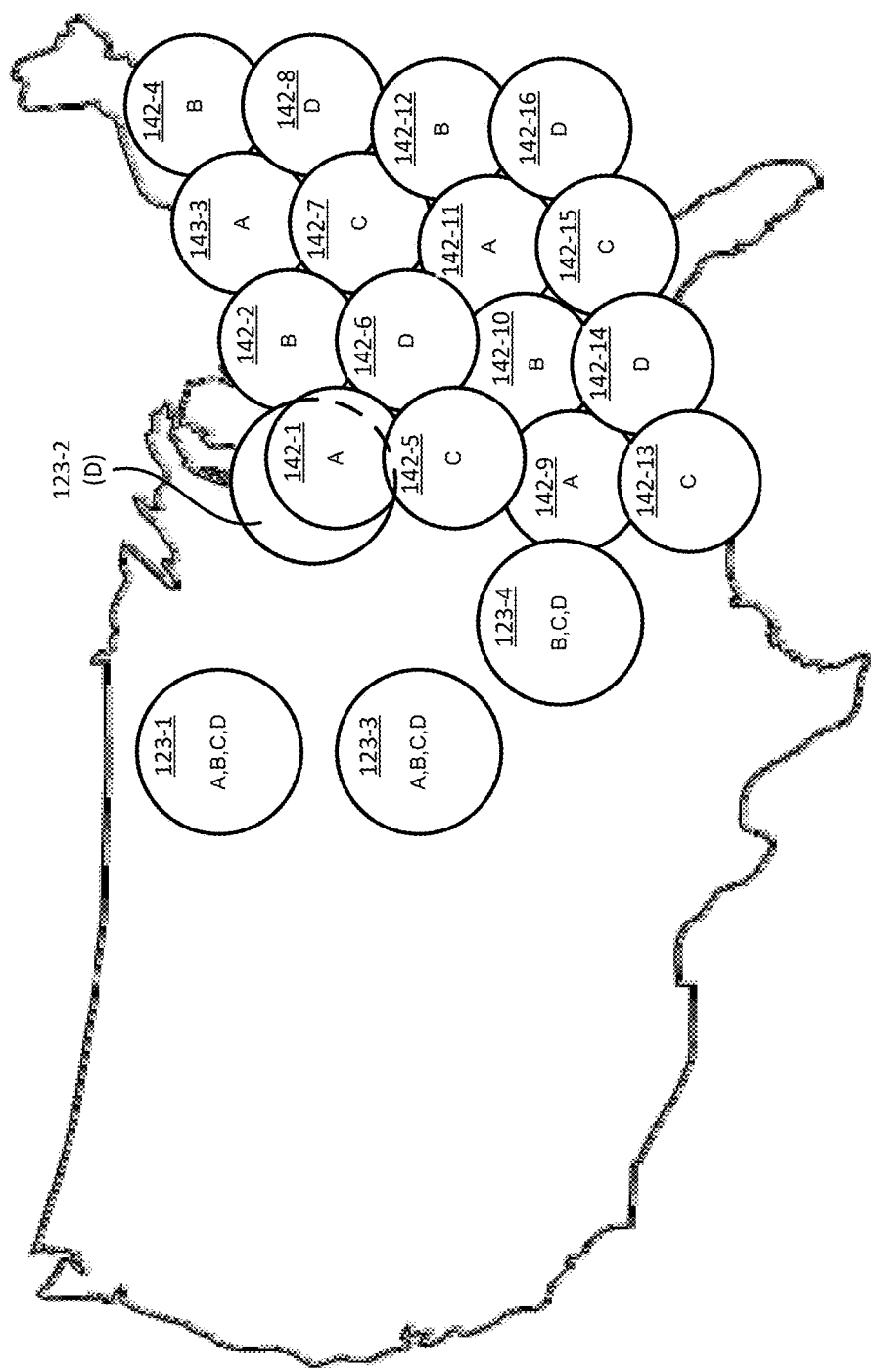
FIG. 4 is a diagram describing another example of unique combinations of frequency and polarization that may be used in a frequency reuse plan.

Another example is shown in FIG. 4 where some of the gateways are adjacent to or overlapping with one or more user beams. For example, gateway beam 123-4 is adjacent to a user beam 142-9 and gateway beam 123-2 is overlapping or adjacent to user beams 142-1, 142-2, and 142-5. Because user beams are adjacent to the gateway beams, the gateway beams operate at a subset of the colors in the allocated frequency band to avoid interference. Specifically in this example, user beam 142-9 is allocated the frequency/polarization combination 'A.' Accordingly, gateway beam 123-4 is assigned the remaining colors 'B,' 'C,' and 'D' without assignment of color A. Gateway beam 123-4 will operate at the reduced frequency allocation to avoid interference in the color 'A' frequency band in user beam 142-9. User beam 142-1 is allocated color 'A', user beam 142-5 is allocated color 'C' and user beam 142-2 is allocated color 'B.' Accordingly, gateway beam 123-2 is assigned color 'D' only without assignment of colors 'A,' 'B,' and 'C' to avoid interference in the other user beams.

As FIG. 4 illustrates, typical frequency re-use plans do not permit frequency re-use between gateway beams and user beams that are adjacent and/or overlapping. For example, potential interference at channels within the colors A, B, and C of adjacent spot beams 142-1, 142-2, and 142-5 generally leads to allocations of a gateway beam such as beam 123-2 at reduced bandwidths only within color D.

In accordance with one embodiment, frequency reuse is provided between terminals in common coverage regions using a multiple satellite architecture with spatial diversity. Different terminals may be associated with different ones of the satellites such that a common frequency can be reused by the different terminals. For example, a gateway may communicate with a first satellite using a feeder beam having a geographic coverage region that overlaps the geographic coverage region of a user beam that a set of user terminals use to communicate with a second satellite. Because of spatial diversity between the satellites, the feeder beam and the user beam may operate at common frequencies within the overlapping coverage region. In this manner, the bandwidth of both satellites at the common coverage region can be used to double the available capacity.

Figure 5:
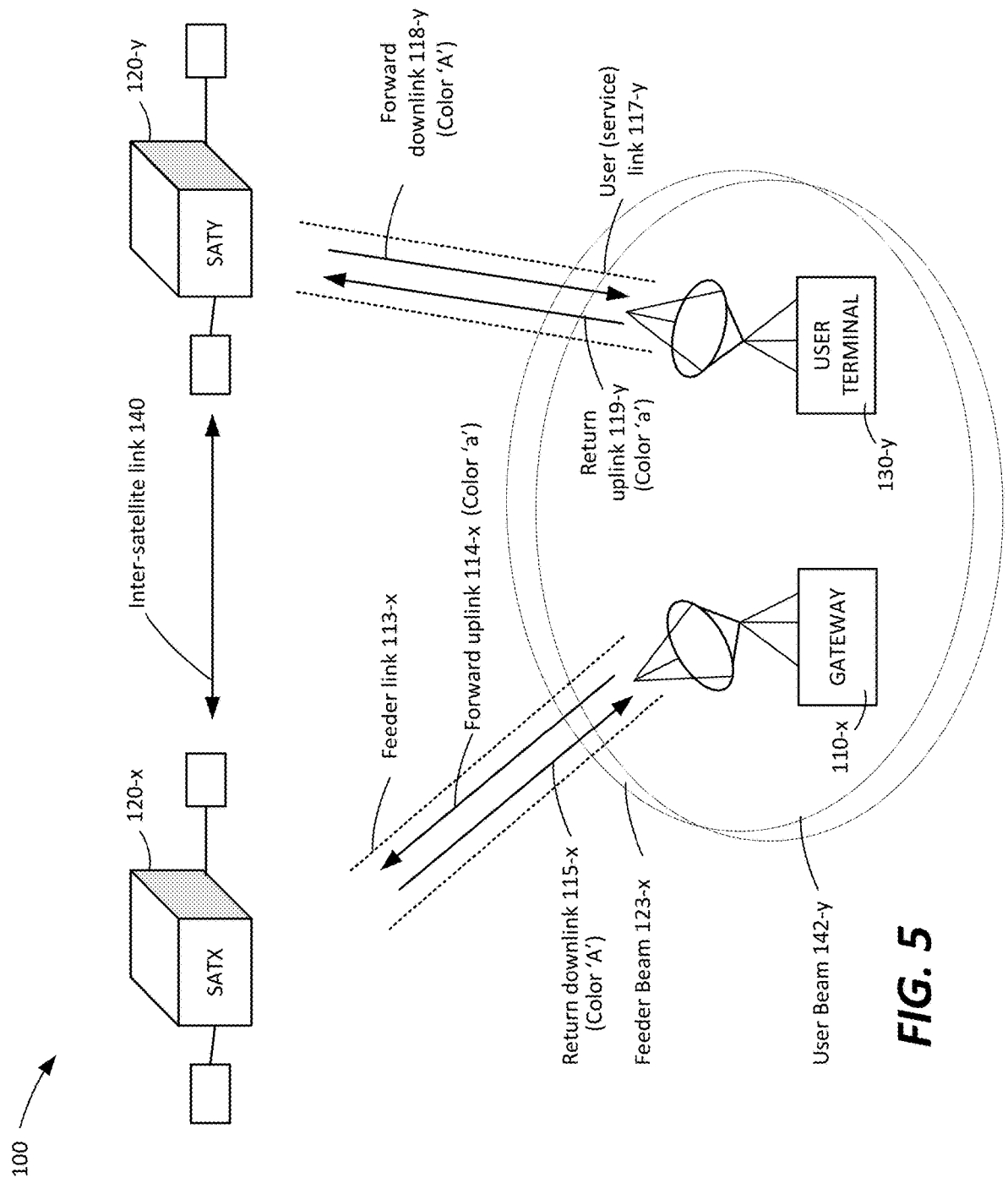
FIG. 5 is a simplified block diagram describing a wireless communications system including a multi-satellite architecture in accordance with one embodiment.

FIG. 5 is a simplified block diagram showing a multiple satellite architecture that permits frequency reuse within a common coverage region according to one embodiment. FIG. 5 shows two satellites 120-$x$ (SATX) and 120-$y$ (SATY), gateway 110-$x$, and user terminal 130-$y$, similar to those described in FIG. 1. In this example, gateway 110-$x$ communicates with satellite 120-$x$ using a feeder link 113-$x$ which is associated with a feeder beam 123-$x$ having the geographical coverage area as shown. Feeder link 113-$x$ includes a forward uplink 114-$x$ and return downlink 115-$x$. User terminal 130-$y$ communicates with satellite 120-$y$ using a user link 117-$y$ which is associated with a user beam 142-$y$ having the geographical coverage area as shown. User link 117-$y$ includes a forward downlink 118-$y$ and a return uplink 119-$y$. A single user terminal 130-$y$ is shown in this example, but a set of user terminals may be operable within the user beam over the user link 117-$y$ as described.

Feeder beam 123-$x$ and user beam 142-$y$ are partially overlapping, forming a common or overlapping geographic coverage region where the two beams overlap. Gateway 110-$x$ and user terminal 130-$y$ are positioned within the common coverage region provided by both the feeder beam and the user beam. As earlier described, typical frequency reuse plans allocate separate F/P combinations to overlapping or adjacent beams, such as when beams such as feeder beam 123-$x$ and user beam 142-$y$ overlap as shown in FIG. 5.

In FIG. 5, however, the overlapping beams are provided by different satellites in a manner that permits frequency reuse between devices that communicate with different individual satellites. Spatial diversity is provided between satellite 120-$x$ and satellite 120-$y$. The spatial diversity provides for spatial isolation between the satellites that permits both satellites to operate at a common frequency and polarization within the overlapping geographic coverage region. A first terminal or set of terminals include antennas that are positioned or formed for directional communication with one satellite while a second terminal or set of terminals include antennas that are positioned or formed for directional communication with the other satellite. In this manner, the first set of terminals may communicate with the first satellite using the same combination of frequency band and antenna polarization that the second set of terminals uses to communicate with the second satellite. The spatial diversity of the satellites and directional antennas of the terminals permit the first satellite to communicate with the first set of terminals without either experiencing unacceptable levels of interference from communication between the second satellite and the second set of terminals. Similarly, the second satellite and second set of terminals will not experience unacceptable levels of interference from the communication with the first satellite at the same F/P combination.

In FIG. 5, gateway 110-x communicates with satellite 120-x over a forward uplink using the F/P combination designated color 'a' and a return downlink using the F/P combination designated color 'A.' At the same time, user terminal 130-y communicates with satellite 120-y over a forward downlink using F/P combination color 'A' and a return uplink using the F/P combination color 'a.' In this manner, gateway 110-x may provide data to satellite 120-x across forward uplink using color 'a.' Satellite 120-x transmits the data to satellite 120-y using inter-satellite communication link 140. Satellite 120-y receives that data and transmits it to user terminal 130-y across forward downlink 118-y using color 'A.' Similarly, user terminal 130-y may provide data to satellite 120-y across return uplink 119-y using color 'a.' Satellite 120-y transmits the data to satellite 120-x using inter-satellite communication link 140. Satellite 120-x receives the data and transmits it to gateway 110-x using color 'A.' In another example, the forward uplink and forward downlink may operate at the same F/P combination, while the return uplink and return downlink operate at the same F/P combination.

FIG. 5 shows the re-use of the F/P combination colors 'a' and 'A' by way of example. The overlapping feeder beam and user beam may both fully utilize any available F/P combination to the satellites. In this manner, the entire available spectrum of each satellite may be used within the overlapping coverage area, subject only to limitations from other adjacent beams formed with the same satellite.

Inter-satellite communication link 140 may operate at any available frequency. In one example, the inter-satellite communication link 140 operates at the same F/P combinations allocated to the gateway and user beams. Because of spatial diversity between the geographic coverage areas of the beams and the other satellite, the satellites may communicate directly using these frequencies without regard to their use for gateway and user beams. In another example, the inter-satellite communication link may operate at a different frequency spectrum than the gateway and user beams. For example, the inter-satellite communication link may utilize infra-red frequencies or optical frequencies.

FIG. 6 is a table showing a specific example of an allocation of unique frequency/polarization combinations for beams associated with multiple satellites. FIG. 6 continues with the color designations of FIG. 3A by way of example and sets forth the allocations that may be made for four of the beams as positioned in FIG. 4. In this example, gateway beam 123-2 is used for communication between a gateway and satellite 120-x over a feeder beam including a forward uplink and return downlink. Three user beams 142-1, 142-2, and 142-5 are used for communication between three respective sets of user terminals and satellite 120-y over respective user beams. As shown in FIG. 4, user beam 142-1, 142-2, and 142-5 are each adjacent to other user beams such that they are assigned a single color downlink color and a single uplink color. User beam 142-2 is allocated color A for the forward downlink and color 'a' for the return uplink. User beam 142-2 is allocated color A for the forward downlink and color 'b' for the return uplink. User beam 142-5 is allocated color C for the forward downlink and color 'c' for the return uplink.

Gateway beam 123-2 is adjacent to and partially overlapping with each of the user beams 142-1, 142-2, and 142-5. In FIG. 4, the gateway beam is only allocated the remaining colors d, D. Because of the spatial diversity between satellite 120-x and satellite 120-y in FIG. 5 however, each of the F/P combinations allocated to these user beams may be re-used for gateway beam 123-2. Accordingly, gateway beam 123-2 is allocated all available F/P combinations for the feeder link. The forward uplink is allocated colors a, b, c, and d, while the return downlink is allocated colors A, B, C, and D. In this manner, the gateway beam provided by the first satellite when the user beams are provided by a second satellite can be allocated three times the capacity when compared with the case where the gateway beam is provided by the same satellite as the overlapping user beams.

FIG. 7 is a flowchart describing a process of allocating a common frequency band and antenna polarization to a feeder link and user link in an overlapping coverage region using multiple satellites according to one embodiment. At step 302, a first satellite provides a feeder beam including a feeder link over a corresponding feeder beam coverage area. The feeder link may include a forward uplink for receiving data from one or more gateways in the feeder beam coverage area and a return downlink for providing data to the one more gateways. At step 304, the second satellite provides a user beam including a user link over a corresponding user beam coverage area. The user link may include a forward downlink for transmitting data to one or more user terminals in the user beam coverage region and a return uplink for receiving data from the one or more user terminals.

At step 306, a first combination of frequency band and antenna polarization is allocated to at least a portion of the feeder beam. For example, the first combination can be assigned to the forward uplink or the return downlink of the feeder link. At step 308, the first combination is also allocated to at least a portion of the user beam. For example, the first combination can be allocated to the forward downlink or the return uplink of the user link. At step 310, the first satellite operates the feeder beam in the overlapping coverage region using the first combination of frequency and polarization. At the same time, the second satellite operates the user beam in the overlapping coverage region using the first combination. For example, the first satellite may receive uplink signals from the gateways at the same frequencies used by the second satellite to receive uplink signals from the user terminals. Similarly, the same frequency could be used for both the forward uplink and forward downlink instead. It is noted that the steps of FIG. 7, and the other processes described by a flowchart herein, may be performed in any order unless otherwise specified. In FIG. 7, for example, the allocations at step 306 and step 308 may be hardwired into the transponder or repeater architecture of the satellites. The first satellite may include a bentpipe or other circuitry that operates over the common F/P combination for communication between the gateway and the satellite and the second satellite may include bentpipe or other circuitry that operates over the common F/P combination for communication between the user terminal and the satellite.

FIG. 8 is a flowchart describing a process of transmitting data between a user terminal and a gateway using a common set of frequency and polarization combinations according to one embodiment. At step 320, a first satellite receives uplink signals from a gateway in a common coverage region using a first F/P combination. The first satellite transmits a signal including the data over an inter-satellite communication link to a second satellite at step 322. The inter-satellite communication link may use the same frequency/polarization combination, but may also use different combinations. Moreover, the inter-satellite communication link may operate in a separate frequency band than the uplinks or downlinks. For example, the inter-satellite link may utilize infra-red or other frequencies, while the uplinks and downlinks use K band, Ka band, etc. frequencies. At step 324, the second satellite transmits the data in a downlink signal to one or more user terminal(s) in the common coverage region using a second F/P combination.

At 326, the second satellite receives data from the user terminal(s) in an uplink signal using the first F/P combination. The second satellite transmits the data to the first satellite using an inter-satellite communication signal at step 328. An inter-satellite link may be used having a first link operating over a first frequency band for transmission form the first satellite to the second satellite and a second link operating over a second frequency band for transmission from the second satellite to the first satellite. At step 330, the second satellite transmits the data from the user terminal to the gateway using the second F/P combination. In FIG. 8, an example is presented where the uplinks both operate at one common combination of frequency band and antenna polarization and the downlinks both operate at a different common combination. In another example, the forward uplink and forward downlink both may operate at one common combination, while the return uplink and return downlink both operate at a different common combination.

Figure 9A:
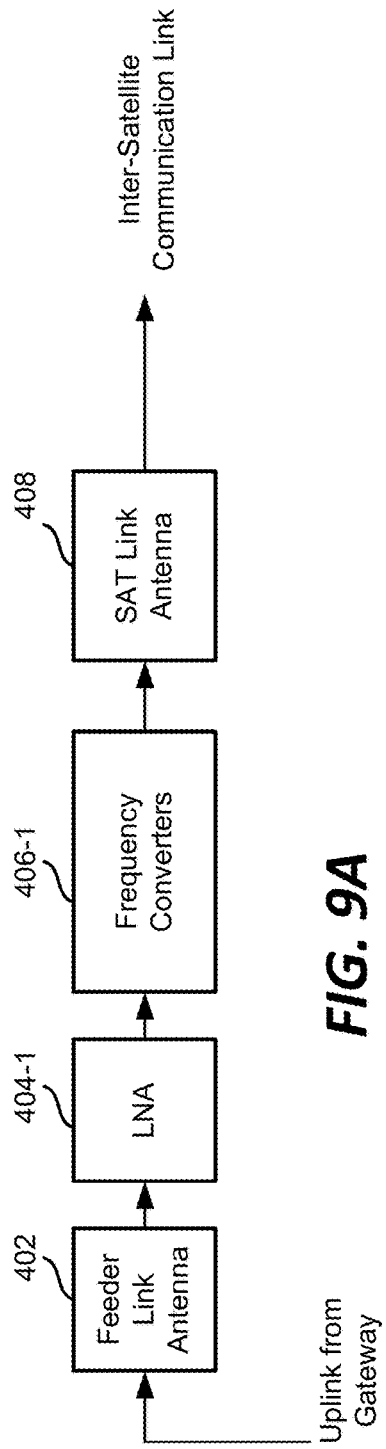
FIG. 9A is a simplified block diagram of the forward payload of a satellite providing a feeder beam in accordance with one embodiment.
Figure 9B:
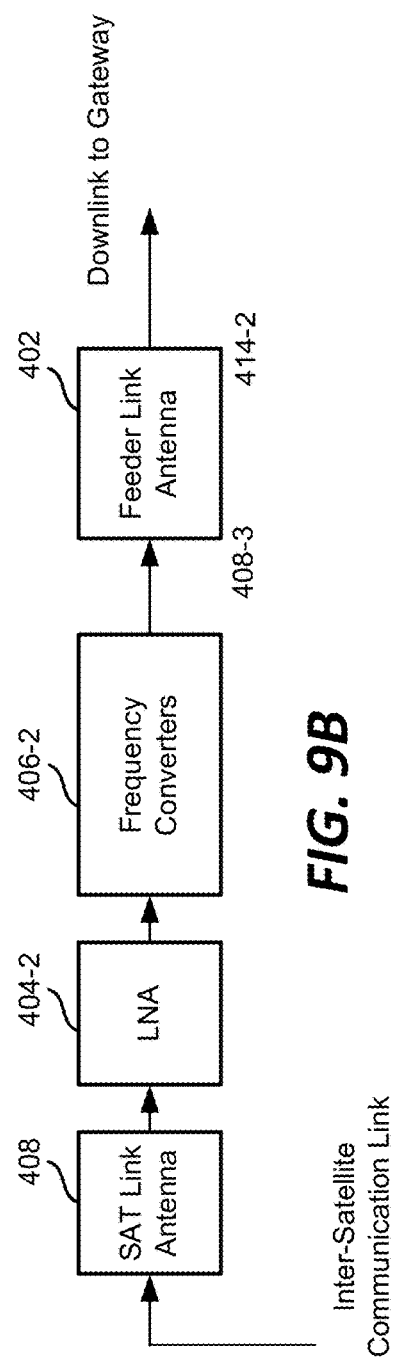
FIG. 9B is a simplified block diagram of the return payload of a satellite providing a feeder beam in accordance with one embodiment.

FIGS. 9A-9B are simplified block diagrams of a payload architecture for a satellite in one example. FIGS. 9A-9B may be used to implement the circuitry for a satellite such as satellite 120-$x$ servicing a gateway in a common coverage region. FIG. 9A depicts a forward payload including transponder or repeater circuitry for communication from a gateway to an inter-satellite communication link with a second satellite (e.g., satellite 120-$y$) and FIG. 9B depicts a return payload including transponder or repeater circuitry for communication from the inter-satellite communication link to the gateway. The satellite is communicatively coupled, via at least one feeder link antenna 402, to at least one gateway 110 (not shown), and via at least one satellite link antenna 408-1 to a second satellite (not shown) over an inter-satellite communication link. A filter or repeater path in FIG. 9A generates inter-satellite communication signals for an inter-satellite communication link. The feeder link antenna may receive uplink signals from the gateway using a first (or more) combination of frequency band and antenna polarization. The received signals are amplified by one or more low-noise amplifiers 404-1. The amplified signals are the converted using one or more frequency converters 406-1. Converter 406-1 may downconvert or upconvert the amplified signals to a frequency band for transmission over the inter-satellite link. In one example, the converters convert a K or Ka band uplink signal to an infrared frequency for the inter-satellite communication link. After conversion, the converted signals are transmitted to the second satellite using inter-satellite communication signals over the inter-satellite communication link.

In FIG. 9B, SAT link antenna 408-1 receives inter-satellite communication signals over the inter-satellite communication link. The signals are amplified using one or more low-noise amplifiers 404-2. The amplified signals are then converted using one or more frequency converters 406-2. Converters 406-2 may downconvert or upconvert the amplified inter-satellite communication signals to a frequency band for the downlink to the gateway. For example, converters 406-2 may convert the signals to a second combination of frequency band and polarization. After conversion, the signals are transmitted to the gateway using downlink signals over a feeder beam.

Figure 10A:
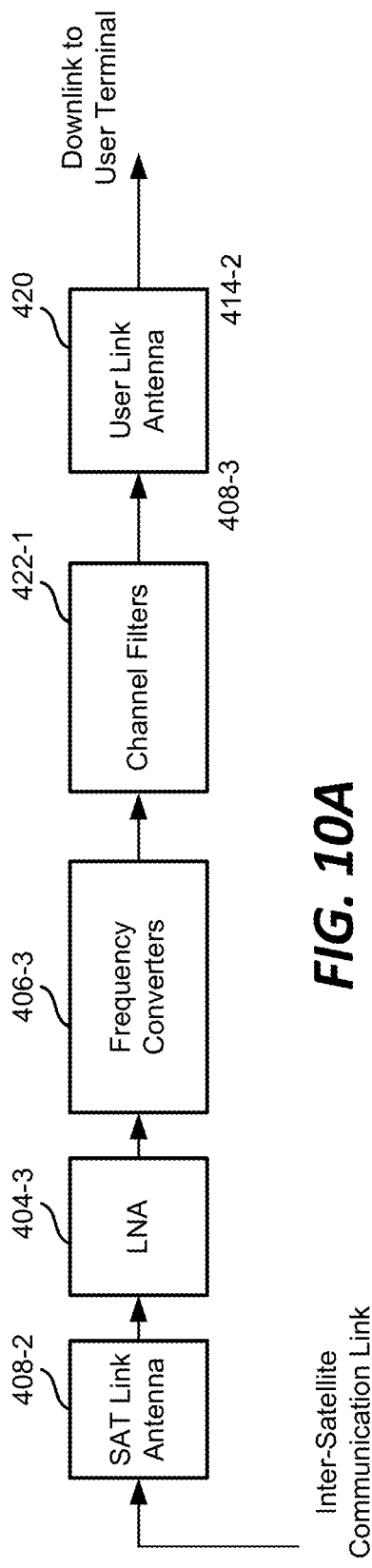
FIG. 10A is a simplified block diagram of the forward payload of a satellite providing a user beam in accordance with one embodiment.
Figure 10B:
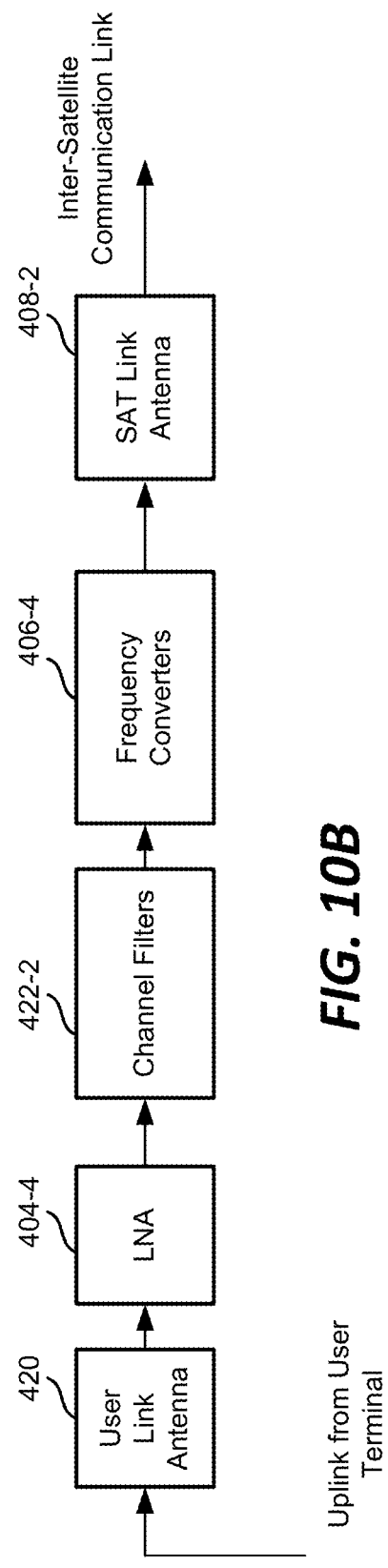
FIG. 10B is a simplified block diagram of the return payload of a satellite providing a user beam in accordance with one embodiment.

FIGS. 10A-10B are simplified block diagrams of a payload for servicing user terminals. FIGS. 10A-10B may be used to implement the circuitry for satellite 120-$y$ for example. FIG. 10A depicts a forward payload including transponder or repeater circuitry for communication from an inter-satellite link to a user terminal. FIG. 10B depicts a return payload including transponder or repeater circuitry for communication from the user terminal to the inter-satellite communication link. A satellite is communicatively coupled, via at least one SAT link antenna 408-2, to a second satellite (not shown) over the inter-satellite communication link, and via at least one user link antenna 420 to at least one user terminal. A filter or repeater path in FIG. 10A generates a downlink to at least one user terminal. The SAT link antenna 408-2 receives inter-satellite communication signals from another satellite. The received signals are amplified by one or more low-noise amplifiers 404-3. The amplified signals are then converted using one or more frequency converters 406-3. Converters 406-3 may downconvert or upconvert the amplified signals to a frequency band for transmission to the user terminal. For example, converters 406-3 may convert the signals to the second combination of frequency band and polarization. The converted signals are then passed to channel filters 422-1. Filters 422-1 filter the signals to select user signals. After filtering, the filtered signals are transmitted to the user terminal using user link antenna 420.

In FIG. 10B, user link antenna 420 receives uplink signals from the user terminal, using the first combination of frequency and polarization, for example. The signals are amplified using one or more low-noise amplifiers 404-4. The amplified signals are passed through channel filters 422-2 to select a bandwidth of the beam. The filtered signals are then converted using one or more frequency converters 406-4. Converters 406-4 may downconvert or upconvert the filtered signals to a band for the inter-satellite communication link. After conversion, the signals are transmitted to the second satellite using inter-satellite communication link.

In one embodiment, the individual satellites are dedicated user terminal satellites or dedicated gateway satellites. In this manner, a single satellite only provides gateway beams or user beams, but not both. The access functions may be segregated between satellites to enable further system optimization. This may be used to improve capacity or reach back to distances between user terminals and gateways than one satellite may be able to perform.

Figure 11:
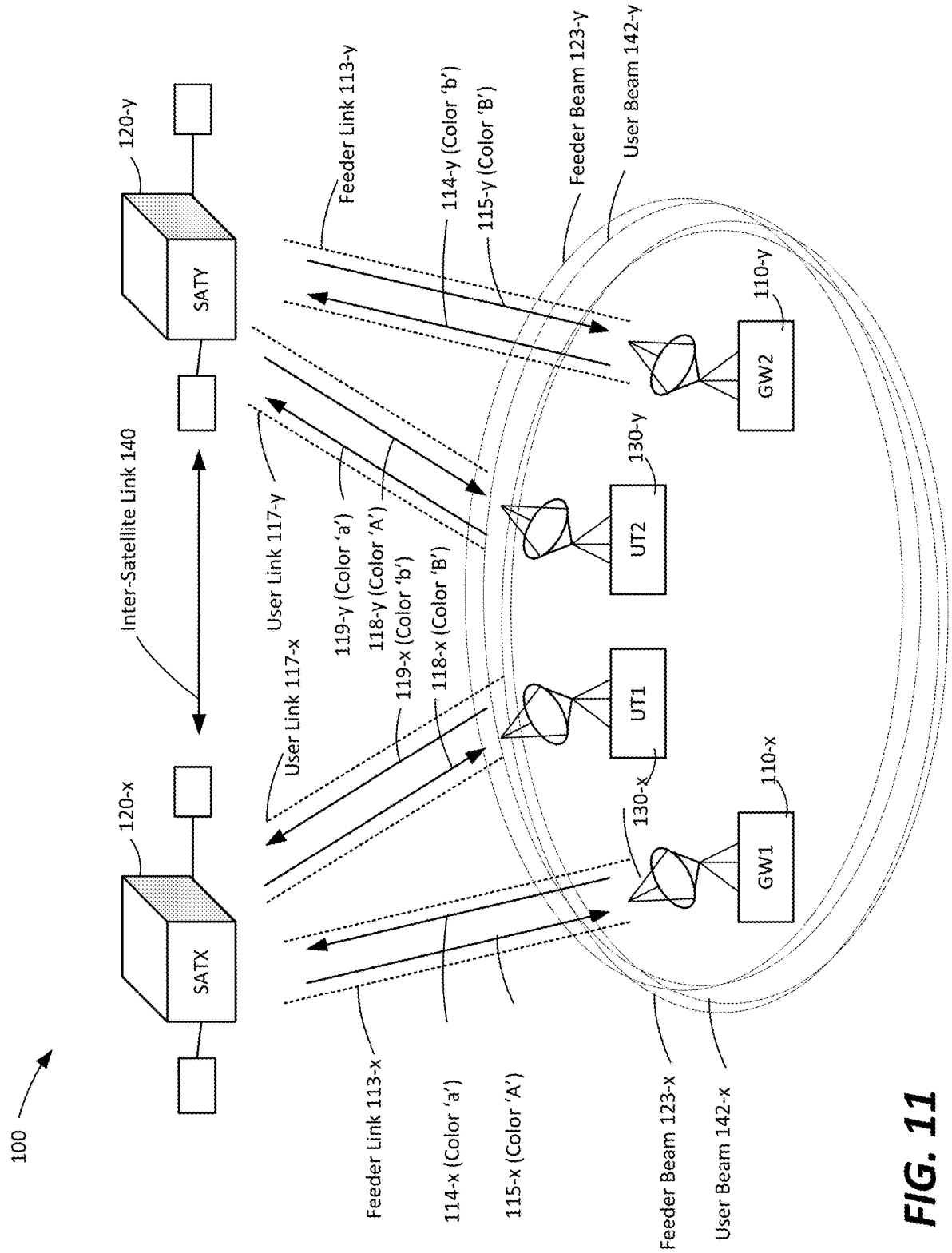
FIG. 11 is a simplified block diagram describing a wireless communications system including multiple satellites that service both gateways and user terminals in a common coverage region.

In another example, the individual satellites may provide feeder beams and user beams to provide connectivity to both gateway terminals and user terminals. FIG. 11 is a simplified block diagram describing one embodiment including multiple satellites that operate over a common frequency band and antenna polarization in a common coverage area to provide connectivity to both gateways and user terminals at both satellites. In FIG. 11, each satellite operates as shown in FIG. 5. Satellite 120-$x$ provides a feeder beam including feeder link 113 that operates over a first set of combination of frequency and polarization (e.g., color 'a' uplink, color 'A' downlink). Satellite 120-$y$ provides a user beam including user link 117 that operates over the first set of F/P combinations. In FIG. 11, each satellite provides complementary access services to the other satellite. In addition to feeder beam 123-$x$, satellite 120-$x$ provides a user beam 142-*x* including user link 117-*x*. In addition to a user beam 142-*y*, satellite 120-*y* provides a feeder beam 123-*y* including feeder link 113-*y*. In this manner, gateway 110-*x* can access satellite 120-*x* to provide access services to a second set of user terminals (UT2) that access satellite 120-*y*. Gateway 110-*x* uses the same F/P combination in accessing satellite 120-*x* as the user terminals 120-*y* use in accessing satellite 120-*y*. In the specific example, the feeder link is shown as operating with a forward uplink at color 'a' and a return downlink at color 'A.' Similarly, user link 117-*y* operates with a forward downlink at color 'A' and a return uplink at color 'a'. Other reuses of the first combination of color 'A' and color 'a' for the uplinks/downlinks can be used as earlier described.

In FIG. 11, the user link 117-*x* at satellite 120-*x* operates over a third and fourth combination of frequency and polarization, which is reused by the feeder link 117-*y* at satellite 120-*y*. In the specifically described example, feeder link 113-*y* includes a forward uplink 114-*y* that operates over the third combination, color 'b', and a return downlink 115-*y* that operates over the fourth combination, color 'B'. Similarly, user link 117-*x* includes a return uplink 119-*x* that operates over the third combination, color 'b', and a forward downlink 118-*x* that operates over the fourth combination, color 'B.' The user links and feeder links can provide complementary access using communication paths as earlier described with respect to the gateways and user terminals. Data can be received at satellite 120-*x* from uplink 114-*x* from gateway 110-*x* using color 'a'. The data is transmitted to satellite 120-*y* using inter-satellite link 140. Satellite 120-*y* transmits the data to the second user terminal 130-*y* over downlink signal 118-*y* using color 'A.' Data can be received at satellite 120-*y* from uplink 119-*y* from the second user terminal 130-*y* using color 'a'. The data is transmitted to satellite 120-*x* using inter-satellite link 140. Satellite 120-*x* transmits the data to the first gateway 110-*x* over downlink signal 115-*x* using color 'A.' Likewise, data can be received at satellite 120-*y* over uplink 114-*y* from gateway 110-*y* using color 'b'. The data is transmitted to satellite 120-*x* using inter-satellite link 140. Satellite 120-*x* transmits the data to the first user terminal 130-*x* over downlink signal 118-*x* using color 'B.' Data can be received at satellite 120-*x* from uplink 119-*x* from the first user terminal 130-*x* using color 'b'. The data is transmitted to satellite 120-*y* using inter-satellite link 140. Satellite 120-*y* transmits the data to the second gateway 110-*y* over downlink 115-*x* using color 'B.'

In FIG. 11, the available bandwidth to each satellite is divided between the user links and feeder links. Nevertheless, the feeder link F/P combination at satellite 120-*x* is reused by the user link at satellite 120-*y* and the user link F/P combination at satellite 120-*x* is reused by the feeder link at satellite 120-*y* within the common coverage area. In this manner, each satellite is able to fully utilize the available bandwidth within the common coverage area without experiencing or providing interference due to spatial diversity between the satellites.

FIG. 12 is a flowchart describing a process of reusing frequencies in a multi-satellite system that employs feeder and user links at each satellite. At step 340, a first satellite provides a first feeder beam and a first user beam associated with a common geographical coverage region. At step 342, a second satellite provides a second feeder beam and a second user beam that are both associated with the common geographical coverage region. At step 344, a first set of F/P combinations is allocated to the first feeder beam and at step 346, a second set of F/P combinations is allocated to the first user beam. Within the feeder and user beams, two combinations of frequency and polarization may be used for the uplinks and downlinks as has been described. At step 348, the first set of F/P combinations is allocated to the second user beam and at step 350, the second set of F/P combinations is allocated to the second feeder beam.

At step 352, the first satellite operates the first feeder beam simultaneously while the second satellite operates the second user beam. Both satellites operate the respective beams using the first set of F/P combinations allocated at steps 344 and 348. At the same time that step 352 is performed, the first satellite operates the first user beam simultaneously while the second satellite operates the second feeder beam at step 354. Both satellites operate the respective beams using the second set of F/P combinations allocated at steps 346 and 350. In this manner, each satellite divides its available bandwidth between the feeder beam and user beam. The frequencies are reused between the two satellites within the common coverage region to provide a capacity equal to the sum of the capacity of the individual satellites.

FIG. 13 is a flowchart describing a process of transmitting data between a first gateway and a second set of user terminals using a first set of frequency and polarization combinations, while transmitting data between a second gateway and a first set of user terminals using a second set of frequency and polarization combinations. The first gateway and first set of user terminals communicate with a first satellite, while the second gateway and the second set of user terminals communicate with a second satellite. Inter-satellite communication links are used to transmit data between the first gateway and the second set of user terminals, and between the second gateway and the first set of user terminals. The process of FIG. 13 includes the process outlined in FIG. 8. Specifically, a first F/P combination is used to transmit data in an uplink between the first satellite and the first gateway (step 320). The data is transmitted to the second satellite in using an inter-satellite communication link (step 322). The second satellite transmits the data in a downlink to the second user terminal using a second F/P combination (step 324). Data is also received from the second user terminal using the first F/P combination (step 326). The data is transmitted to the first satellite using the inter-satellite communication link (step 328). The first satellite transmits the data in a downlink to the first gateway using the second F/P combination (step 330).

In addition to the process described in FIG. 8, the process of FIG. 13 includes providing data between the first set of user terminals that communicate with the first satellite and the second gateway that communicates with the second satellite. At step 360, the second satellite receives uplink signals from the second gateway in the common coverage region using a third F/P combination. The second satellite transmits a signal including the data over an inter-satellite communication link to the first satellite at step 362. At step 364, the first satellite transmits the data in a downlink signal to a first user terminal or set of user terminals in the common coverage area using a fourth F/P combination.

At 366, the first satellite receives data from the first user terminal(s) in an uplink signal using the third F/P combination. The first satellite transmits the data to the second satellite using an inter-satellite communication signal at step 368. At step 370, the second satellite transmits the data from the first user terminal to the second gateway using the fourth F/P combination. In FIG. 13, an example is presented where the uplinks between a first gateway and first user terminal both operate at one common combination of frequency band and antenna polarization and the downlinks both operate at a different common combination. In another example, the forward uplink and forward downlink both may operate at one common combination, while the return uplink and return downlink both operate at a different common combination. Similarly, the forward uplink and forward downlink between the second gateway and the first user terminal may operate at the third combination, while the return uplink and return downlink both operate at the fourth combination.

Figure 14:
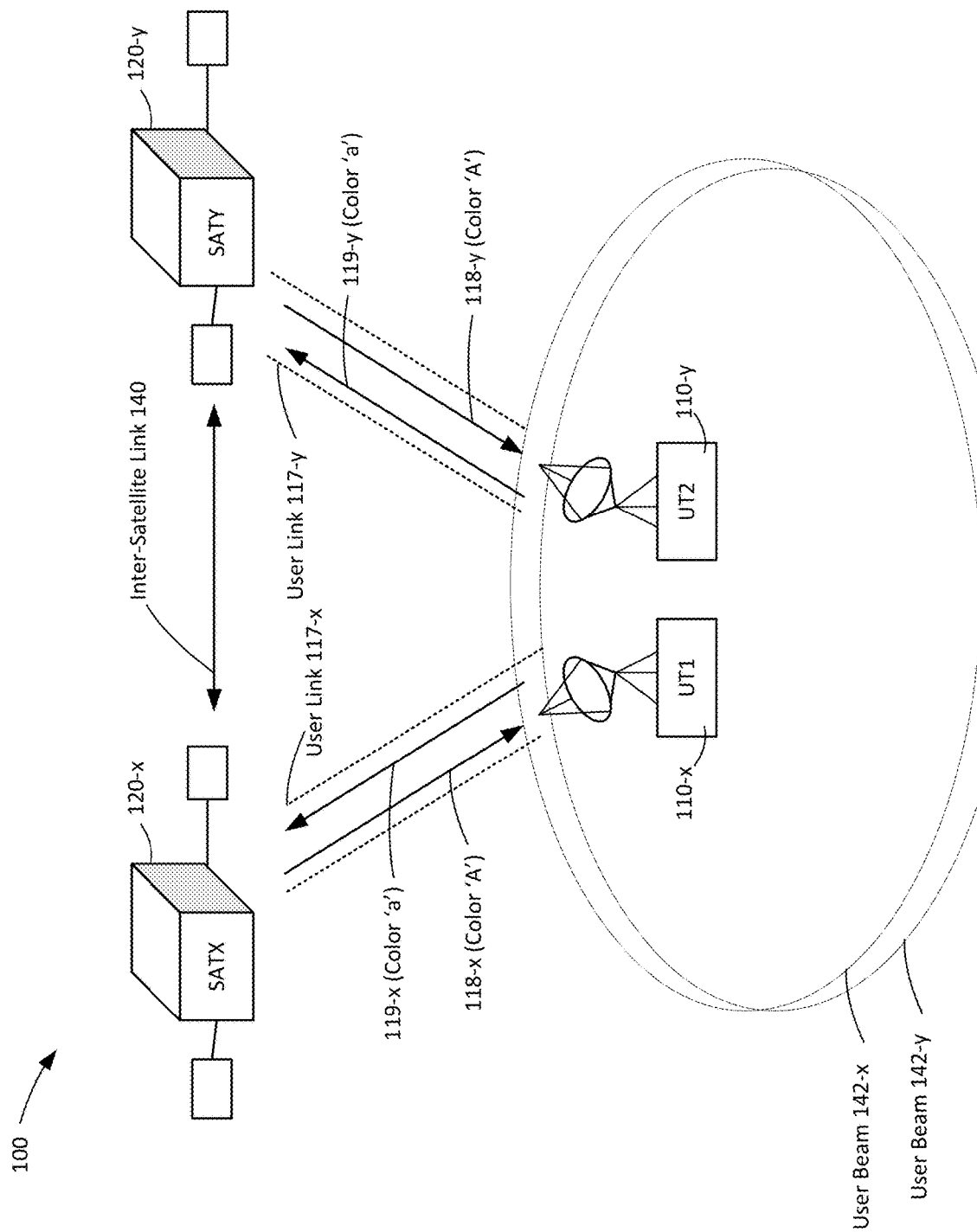
FIG. 14 is a simplified block diagram describing a wireless communications system including multiple satellites that provide communication between user terminals.

FIG. 14 is a simplified block diagram describing one embodiment including multiple satellites that operate over a common frequency band and antenna polarization in a common coverage area. In FIG. 14, an example is described whereby two user terminals in a common coverage region communicate across an inter-satellite link using a common frequency band and antenna polarization for communication with respective satellites. Satellite 120-x provides a user beam 142-x including a user link 117-x that operates over a first set of combination of frequency and polarization (color 'a' uplink, color 'A' downlink). Satellite 120-y provides a second user beam 142-y including a user link 117-y that operates over the first set of F/P combinations. In the specific example, the first user link 117-x is shown as operating with a forward uplink at color 'a' and a return downlink at color 'A.' Similarly, user link 117-y operates with a forward downlink at color 'A' and a return uplink at color 'a'. Other reuses of a combination of frequency band and antenna polarization can be used as earlier described.

In FIG. 14, direct bi-directional communication between the two user terminals may be established using a common F/P combination in the common coverage area. Satellite 120-x can receive data in an uplink 119-x over user link 117-x at a first F/P combination (e.g., color 'a'). Satellite 120-x transmits the data to satellite 120-b using inter-satellite communication link 140. Satellite 120-y transmits the data to user terminal 110-y over downlink 118-y of user link 117-y at a second F/P combination (color 'A'). Simultaneously, satellite 120-y may receive data in an uplink 119-y of user link 117-y at the first F/P combination. Satellite 120-y transmits the data to satellite 120-x using inter-satellite communication link 140. Satellite 120-x transmits the data to user terminal 110-x over downlink 118-x of user link 117-x. In one embodiment, each satellite includes a router or channel-switching capability to allow user terminal to user terminal connectivity with high bandwidth. In FIG. 14, each user terminal uses the same F/P combination for the uplink signals and the same F/P combination for the downlink signals. In another example, one user terminal may use the first combination for the uplink signals and the second combination for the downlink signals, while another user terminal uses the first combination for the downlink signals and the second combination for the uplink signals.

Accordingly, there has been described a method of satellite communication that includes providing a feeder beam at a first satellite using a first combination of frequency band and antenna polarization, transmitting from the first satellite to a second satellite a first set of inter-satellite communication signals based on first data received from the feeder beam, providing a service beam at the second satellite using the first combination of frequency band and antenna polarization. A second combination of frequency band and antenna polarization is used to transmit from the second satellite to the first satellite a second set of inter-satellite communication signals based on second data received from the service beam. The feeder beam is associated with a feeder beam coverage area and the service beam is associated with a service beam coverage area that is at least partially overlapping with the feeder beam coverage area.

A wireless communication system has been described that includes a first satellite configured to provide a feeder beam over a feeder beam coverage area using a first combination of frequency band and antenna polarization, and a second satellite configured to provide a service beam over a service beam coverage area using the first combination of frequency band and antenna polarization. The first satellite is configured to transmit to a second satellite a first inter-satellite communication signal based on first data received from the feeder beam. The second satellite is configured to transmit to the first satellite a second inter-satellite communication signal based on second data received from the service beam. The service beam coverage area is at least partially overlapping with the feeder beam coverage area.

A wireless communication system has been described that includes a first satellite having one or more first repeaters including an input configured to receive first data in a first set of uplink signals of a feeder beam using a first combination of frequency band and antenna polarization and a second satellite having one or more second repeaters including an input configured to receive second data in a second set of uplink signals of a service beam using the first combination of frequency band and antenna polarization. The feeder beam has a feeder beam coverage area. The one or more repeaters have an output configured to transmit to the second satellite a first set of inter-satellite communication signals based on the first data received from the feeder beam. The service beam has a user beam coverage area that is at least partially overlapping with the feeder beam coverage area. The one or more second repeaters have an output configured to transmit to the first satellite a second set of inter-satellite communication signals based on the second data received from the service beam.

A method of satellite communication has been described that includes receiving first data at a first satellite from a feeder beam using a first combination of frequency band and antenna polarization, transmitting the first data from the first satellite to a second satellite using a first inter-satellite communication link. The second satellite receives the second data from a user beam using the first combination of frequency band and antenna polarization, and transmitting the second data from the second satellite to the first satellite using a second inter-satellite communication link. The feeder beam has a feeder beam coverage area. The user beam has a user beam coverage area that is at least partially overlapping with the feeder beam coverage area.

A method of satellite communication has been described that includes providing a first user beam at a first satellite using a first combination of frequency band and antenna polarization, transmitting from the first satellite to a second satellite a first set of inter-satellite communication signals based on data received from the first user beam, providing a second user beam at the second satellite using the first combination of frequency band and antenna polarization, and transmitting from the second satellite to the first satellite a second set of inter-satellite communication signals based on data received from the second user beam the second user beam. The feeder beam and the user beam include a common coverage region.

A method of satellite communication has been described that includes receiving at a first satellite a first uplink signal from a first gateway using a first combination of frequency band and antenna polarization. The first gateway is located in a common coverage region corresponding to a first gateway beam for the first satellite and a first user beam for a second satellite. The method includes transmitting from the first satellite to the second satellite a first inter-satellite communication signal based on the first uplink signal, and transmitting from the second satellite to a first user terminal a first downlink signal based on the inter-satellite communication signal. The first downlink signal uses a second combination of frequency band and antenna polarization, and the first user terminal is located in the common coverage region corresponding to the first user beam for the second satellite. The method includes receiving at the second satellite a second uplink signal from the first user terminal using the first combination of frequency band and antenna polarization, transmitting from the second satellite to the first satellite a second inter-satellite communication signal based on the second uplink signal, and transmitting from the first satellite to the first gateway a second downlink signal based on the second inter-satellite communication signal. The second downlink signal utilizing the second combination of frequency band and antenna polarization.

A method of satellite communication has been described that includes receiving at a first satellite a first uplink signal from a first user terminal using a first combination of frequency band and antenna polarization. The first user terminal is located in a common coverage area corresponding to a first user beam for the first satellite and a second user beam for a second satellite. The method includes transmitting from the first satellite to the second satellite a first inter-satellite communication signal based on the first uplink signal, and transmitting from the second satellite to a second user terminal a first downlink signal based on the inter-satellite communication signal. The first downlink signal utilizes a second combination of frequency band and antenna polarization, and the second user terminal is located in the common coverage area corresponding to the second user beam for the second satellite. The method includes receiving at the second satellite a second uplink signal from the second user terminal using the first combination of frequency band and antenna polarization, transmitting from the second satellite to the first satellite a second inter-satellite communication signal based on the second uplink signal, and transmitting from the first satellite to the first user terminal a second downlink signal using the second combination of frequency band and antenna polarization.

A method of satellite communication has been described that includes receiving data at a first satellite from a feeder beam using a first combination of frequency band and antenna polarization, the feeder beam having a feeder beam coverage area, transmitting the data from the first satellite to a second satellite using an inter-satellite communication link, and providing the data from the second satellite in a user beam using the first combination of frequency band and antenna polarization. The user beam has a user beam coverage area that is at least partially overlapping with the feeder beam coverage area.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

What is claimed is:

1. A method of satellite communication, comprising:
receiving first data at a first satellite from a first feeder beam using a first combination of frequency band and antenna polarization, the first feeder beam having a first feeder beam coverage area;
transmitting the first data from the first satellite to a second satellite using a first inter-satellite communication link;
receiving second data at the second satellite from a second user beam using the first combination of frequency band and antenna polarization, the second user beam having a second user beam coverage area that is at least partially overlapping with the first feeder beam coverage area;
transmitting the second data from the second satellite to the first satellite using a second inter-satellite communication link;
transmitting the second data from the first satellite to a first gateway in an overlapping region of the first feeder beam coverage area and the second user beam coverage area using a second combination of frequency band and antenna polarization; and
transmitting the first data from the second satellite to a second user terminal in the overlapping region using the second combination of frequency band and antenna polarization
receiving third data at the first satellite from a first user terminal in the overlapping region using a first user beam at a third combination of frequency band and antenna polarization, the first user beam covering the overlapping region;
transmitting the third data from the first satellite to the second satellite using a third inter-satellite communication link; and
receiving fourth data at the second satellite from a second gateway using a second feeder beam at the third combination of frequency band and antenna polarization, the second feeder beam covering the overlapping region.

2. The method of claim 1, further comprising:
transmitting the fourth data from the first satellite to the first user terminal in the overlapping region using a fourth combination of frequency band and antenna polarization; and
transmitting the third data from the second satellite to the second gateway using the fourth combination of frequency band and antenna polarization.

3. A method of satellite communication, comprising:
at a first satellite, providing a first user beam using a first combination of frequency band and antenna polarization, the first user beam is associated with a common coverage region;
transmitting from the first satellite to a second satellite a first set of inter-satellite communication signals based on data received from the first user beam;
at the second satellite, providing a second user beam using the first combination of frequency band and antenna polarization, the second user beam is associated with the common coverage region;
transmitting from the second satellite to the first satellite a second set of inter-satellite communication signals based on data received from the second user beam;
providing the first user beam comprises receiving at the first satellite a first uplink signal including first data from a first user terminal using the first combination of frequency band and antenna polarization, the first user terminal is located in the common coverage region;

transmitting the first set of inter-satellite communication signals includes transmitting a first inter-satellite communication signal including the first data; and providing the second user beam comprises transmitting to a second user terminal a first downlink signal including the first data using a second combination of frequency band and antenna polarization, the second user terminal is located in the common coverage region;

providing the second user beam comprises receiving at the second satellite a second uplink signal including second data from the second user terminal using the first combination of frequency band and antenna polarization;

transmitting the second set of inter-satellite communication signals includes transmitting a second inter-satellite communication signal including the second data; and providing the first user beam comprises transmitting to the first user terminal a second downlink signal including the second data using the second combination of frequency band and antenna polarization.

4. The method of claim 3, further comprising:
converting the first data from the first uplink signal from the frequency band of the first combination of frequency band and antenna polarization to a third frequency, wherein the first inter-satellite communication link uses the third frequency.

5. The method of claim 4, wherein the fourth is an infrared frequency.

6. The method of claim 4, wherein the fourth is an optical frequency.

7. The method of claim 4, wherein the frequency band of the first combination of frequency band and antenna polarization is in the K band.

8. The method of claim 4, wherein the frequency band of the first combination of frequency band and antenna polarization is in the Ka band.

9. The method of claim 3, wherein the first inter-satellite communication link uses the frequency of the first combination of frequency band and antenna polarization.

10. The method of claim 9, wherein the frequency band of the first combination of frequency band and antenna polarization is in the K band.

11. The method of claim 9, wherein the frequency band of the first combination of frequency band and antenna polarization is in the Ka band.

12. The method of claim 1, further comprising:
converting the first data from the first feeder beam from the frequency band of the first combination of frequency band and antenna polarization to a fourth frequency, wherein the first inter-satellite communication link uses the fourth frequency.

13. The method of claim 12 wherein the fourth is an infrared frequency.

14. The method of claim 12, wherein the fourth is an optical frequency.

15. The method of claim 12, wherein the frequency band of the first combination of frequency band and antenna polarization is in the K band.

16. The method of claim 12, wherein the frequency band of the first combination of frequency band and antenna polarization is in the Ka band.

17. The method of claim 1, wherein the first inter-satellite link uses the frequency of the first combination of frequency band and antenna polarization.

18. The method of claim 17, wherein the frequency band of the first combination of frequency band and antenna polarization is in the K band.

19. The method of claim 17, wherein the frequency band of the first combination of frequency band and antenna polarization is in the Ka band.

* * * * *